United States Patent [19]
McCowin et al.

[11] Patent Number: 6,012,877
[45] Date of Patent: Jan. 11, 2000

[54] SELF-CENTERING END EFFECTOR

[75] Inventors: Peter D. McCowin, Enumclaw; Dennis M. Cordy; Ronald J. Smith, both of Auburn; David L. Wagner, Kent, all of Wash.

[73] Assignee: The Boeing Company, Seattle, Wash.

[21] Appl. No.: 08/768,169

[22] Filed: Dec. 13, 1996

[51] Int. Cl.[7] .................................................. B23B 35/00
[52] U.S. Cl. .......................... 408/1 R; 279/2.04; 408/79; 408/97; 901/41
[58] Field of Search ................. 408/1 R, 79, 80, 408/81, 82, 85, 86, 95, 97, 98, 99, 72 R; 901/30, 41; 279/2.02, 2.04

[56] References Cited

U.S. PATENT DOCUMENTS

| | | | |
|---|---|---|---|
| 2,592,432 | 4/1952 | Kline et al. | 408/80 |
| 2,963,927 | 12/1960 | Hanger | 408/79 |
| 4,286,902 | 9/1981 | Gagliano et al. | 408/79 |
| 5,127,139 | 7/1992 | McCowin et al. | 29/26 |
| 5,161,921 | 11/1992 | Corsi | 408/95 |
| 5,277,526 | 1/1994 | Corsi | 408/97 |
| 5,299,894 | 4/1994 | McCowin | 408/1 R |
| 5,477,596 | 12/1995 | Schlosstein et al. | 29/33 |
| 5,482,409 | 1/1996 | Dunning et al. | 408/1 R |
| 5,560,102 | 10/1996 | Micale et al. | 29/897.2 |

*Primary Examiner*—Steven C. Bishop
*Attorney, Agent, or Firm*—John C. Hammar

[57] ABSTRACT

An end effector (30) adap ttachment to and accurate positioning by a robot is provided for positioning a channel-shaped workpiece (10) at a desired position and drilling an accurately located positioning hole in the work piece, even if the workpiece is curved or has a compound contour. The end effector (30) includes a conventional speeder assembly (68) with a taper that can be grasped by the robot and rotated for transfer of torque to the speeder assembly. A flange base (54) is attached to the speeder assembly (68) and has a central opening to accommodate a drill bit (67). A housing assembly (50) is slidably mounted around the flange base (54) through a linear bearing (109). An index shaft (32) is slidably mounted partially within the housing assembly (50) through a second linear bearing (110). A collet (36) is concentrically mounted slidably about the index shaft (32). The collet (36) is adapted to expand radially when it is forced over a wider portion (34) of the index shaft (32). The radial expansion of the collet (36) provides the necessary force to position the channel-shaped workpiece (10).

11 Claims, 5 Drawing Sheets

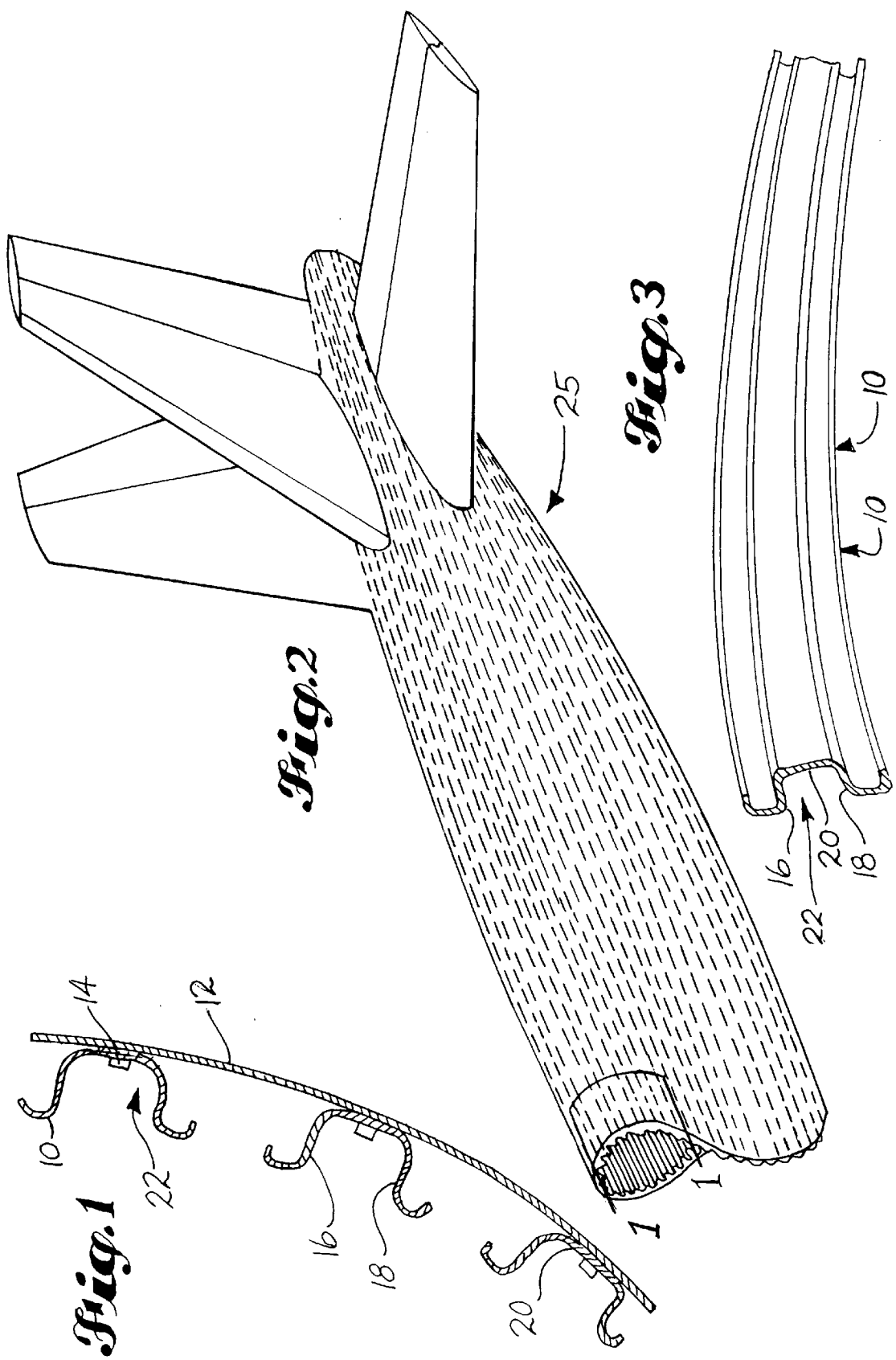

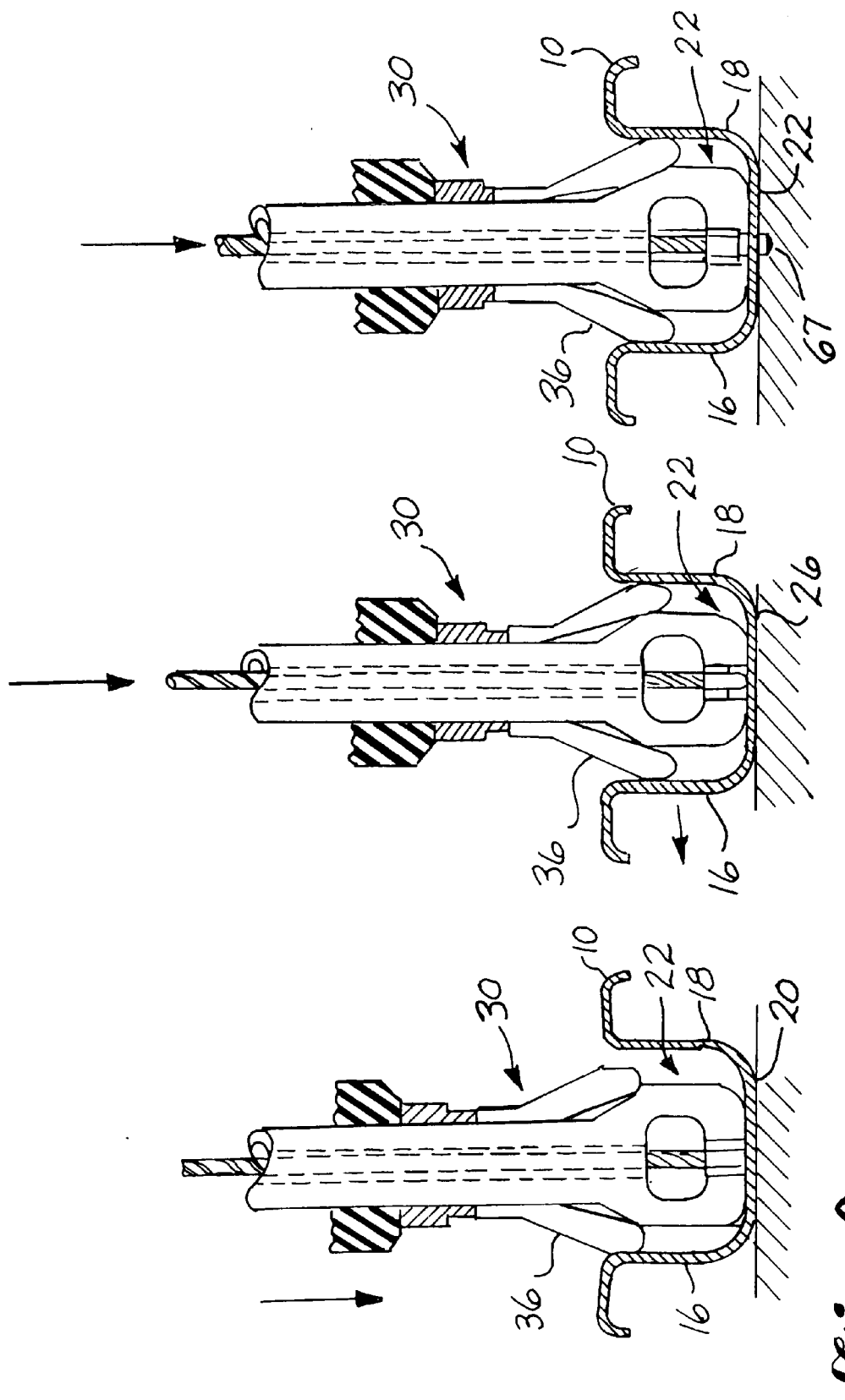

SELF-CENTERING END EFFECTOR

BACKGROUND OF THE INVENTION

1. Field of the Invention

This device relates to end effectors manipulated by robots, for positioning, and more particularly to centering a channel-shaped workpiece under the end effector.

2. Background Information

A need has developed in industry for an end effector that can be picked up and manipulated by a robot and used to position a workpiece and then drill a hole in the workpiece that can be used for subsequent assembly of the workpiece with other parts of a product. An end effector with this capability would be useful in many traditional manufacturing applications, but finds especially significant utility in a virtual tooling assembly, such as that which is disclosed in U.S. Pat. No. 5,560,102 to Micale et al entitled "PANEL AND FUSELAGE ASSEMBLY," that is assigned to the assignee of this invention and is incorporated herein by reference.

In traditional manufacturing, parts are normally held in tooling fixtures and assembly jigs is to accurately locate the parts by butting their edges against hard stops on the tooling. From those stops, locations on the part are determined for holes, fasteners, and other manufacturing processes which are performed on the part. Assuming that the part is located properly on the tooling and that the drill guides and other parts of the tooling for performing the manufacturing processes have been accurately located, the part will be accurately manufactured. However, in the real-life environment of a factory, the tooling receives some heavy and sometimes abusive use and the accuracy of the stops, drill guides, and other elements of the tooling frequently become worn or otherwise out of adjustment. When this happens, the manufacturing processes on the part can be performed at an incorrect location on the part resulting in slight misalignment of the elements of the manufactured product, or if the misalignment is severe, a rejected part. The result is increased cost of manufacturing and a degradation of quality.

A new manufacturing technique has been developed called "soft tooling" or "virtual tooling" which eliminates the need for hard tooling used for positioning of holes, fasteners, and other manufacturing processes. The soft tooling technique uses information from the original engineering drawings of the part, such as a panel, to locate the holes and other items on the panel without reference to hard tooling reference stops. One technique is to mount the panel on a fixture which holds it in a fixed position and contour but without reliance on the position of any hard stops on the fixture. The panel is then machined with a router tool around its entire edge to give it the precise exterior dimensions required by the original engineering data. The holes, fasteners, and parts which are to be placed at particular positions on the panel, are located by positioning or coordination holes drilled in the panel by an end effector held in a highly accurate robot. The positioning of the robot is accomplished by software using positioning information derived from the engineering drawing of that part. Any other components which must be attached to the panel are drilled at the same time or on another fixture so that the positioning holes in the panel and on the other components are precisely accurate, well within the required tolerance. After drilling the positioning holes, the panel and other components are removed from the fixture, and the components may be drilled and assembled to the part using the positioning holes. In this way, the components are always located accurately, and the care and recalibration of hard tooling becomes an obsolete requirement.

One such end effector is disclosed in U.S. Pat. No. 5,127,139 entitled "STRINGER CLIP END EFFECTOR" by McCowin, et al, which is assigned to the assignee of this invention. Another end effector desired for aircraft manufacturing is one which will align a channel-shaped workpiece such as a stringer at a desired position with respect to the drill axis and hold the stringer in that position while it drills a hole in a stringer channel at the desired lateral position and at the desired position along its length. This end effector is disclosed in U.S. Pat. No. 5,299,894 to McCowin, which is assigned to the assignee of this invention.

The robot used in the particular embodiment of the "virtual tooling" or soft tooling development noted above is a JOMACH 16, manufactured by JOBS Corp. of Italy, which is most accurate when using a tapered shank coupling for the end effector. This coupling does not include provision for auxiliary power for the end effector, so all of the functions must be powered by the rotational power delivered by the robot's spindle, or the force that the robot can exert in the "Z" direction. Since one of the functions required by the drilling and centering end effector is to position the center of the stringer channel under the drill so that the hole is drilled in the exact center of the stringer channel, or at the desired position in the channel specified by the engineering data, the lateral movement of the stringer must be accomplished using rotational power or "Z" axis pushing force.

The solution to this centering problem disclosed in U.S. Pat. No. 5,299,894, has a pair of cam rollers projecting down from a base plate equidistant from the centerline of the end effector and aligned on the lateral axis that intersects the centerline of the end effector to center a channel-shaped workpiece, such as a stringer, on the centerline of the end effector. The cam rollers work by entering into the channel of the workpiece, which may be slightly misaligned with the centerline and then rotating about the centerline of the cam roller shaft. Rotation of the shaft engages one of a pair of rollers with the side of the channel and pushes the stringer toward a centered position. Once the stringer reaches the centered position both rollers are engaged with the sides of the channel in the stringer and the stringer is centered on the lateral axis connecting the two cam roller shafts of the two cam rollers, and a hole is drilled in the center of the channel of the stringer by a drill.

The problem with the solution in the U.S. Pat. No. 5,299,894 is that it is only effective if the stringer is straight and flat. If not, the center of the drill end effector, will not correspond to the desired centered location on the stringer. This is because the center point is being determined using typically four points in contact with the walls of the channel in the workpiece and two points in contact with the bottom of the channel in the workpiece. If the workpiece is curved the center of the drill will not correspond to the desired center of the stringer.

SUMMARY OF THE INVENTION

According to one aspect of this invention, an end effector is capable of positioning a stringer, particularly a hat-section stringer, at a desired position under the centerline of a tool and performing an operation at that point even if the member is curved or has a compound contour. Although, reference is made to a stringer for use on aircraft, the end effector of this invention could be used for other purposes which will be apparent to a person of ordinary skill in the art. The end effector of this invention is able to provide this improved centering while still using only the Z-force, pushing force, of the robot. Although the end effector of this invention solves the problem of use on curved or compound contours, it will also work on straight and flat stringers as well. The end effector of this invention is well suited for use with a robot or a typical 5-axis numerically controlled machine tool, but it could also be used during manual operations as well.

The end effector of this invention comprises an index shaft that is wider at the end which contacts the stringer. A collet slidably mounted concentrically around the index shaft is able to expand radially. As the collet slides over the wider portion of the index shaft it is forced to expand radially until it comes in contact with a wall of the stringer. Forcing the collet to continue to slide over the index shaft will cause the collet to expand radially forcing the stringer to move toward a desired position. Once the collet has expanded and the stringer has moved to a position at which the expanded collet contacts opposite walls of the stringer, a force balance is achieved and the end effector is centered over a point on the stringer. The end effector can then perform some desired function at the established centerpoint.

The end effector of this invention is able to position a curved or compound contoured stringer under a desired centerline by having a single point of contact where the index shaft contacts the bottom of the stringer and the collet achieves a force balance across the expanded collet once opposite walls of the stringer are contacted.

The end effector of this invention is especially suited for positioning the stringer and drilling a hole at the desired location. These holes can subsequently be used to align the stringer during future manufacturing operations. Although the end effector is especially suited for drilling operations, it may be used on other operations where it is desirable to perform an operation at a point on a curved or compound contoured stringer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a sectional view of hat section stringers attached to the fuselage of an aircraft.

FIG. 2 is a perspective view of the tail section of an aircraft.

FIG. 3 is a perspective view of a compound contour stringer.

FIG. 9 is a schematic sketch of the end effector during a centering operation.

FIG. 10 is a schematic sketch of the end effector during a centering operation.

FIG. 11 is a schematic sketch of the end effector during a centering and drilling operation.

DESCRIPTION OF A PREFERRED EMBODIMENT

Figure 4:
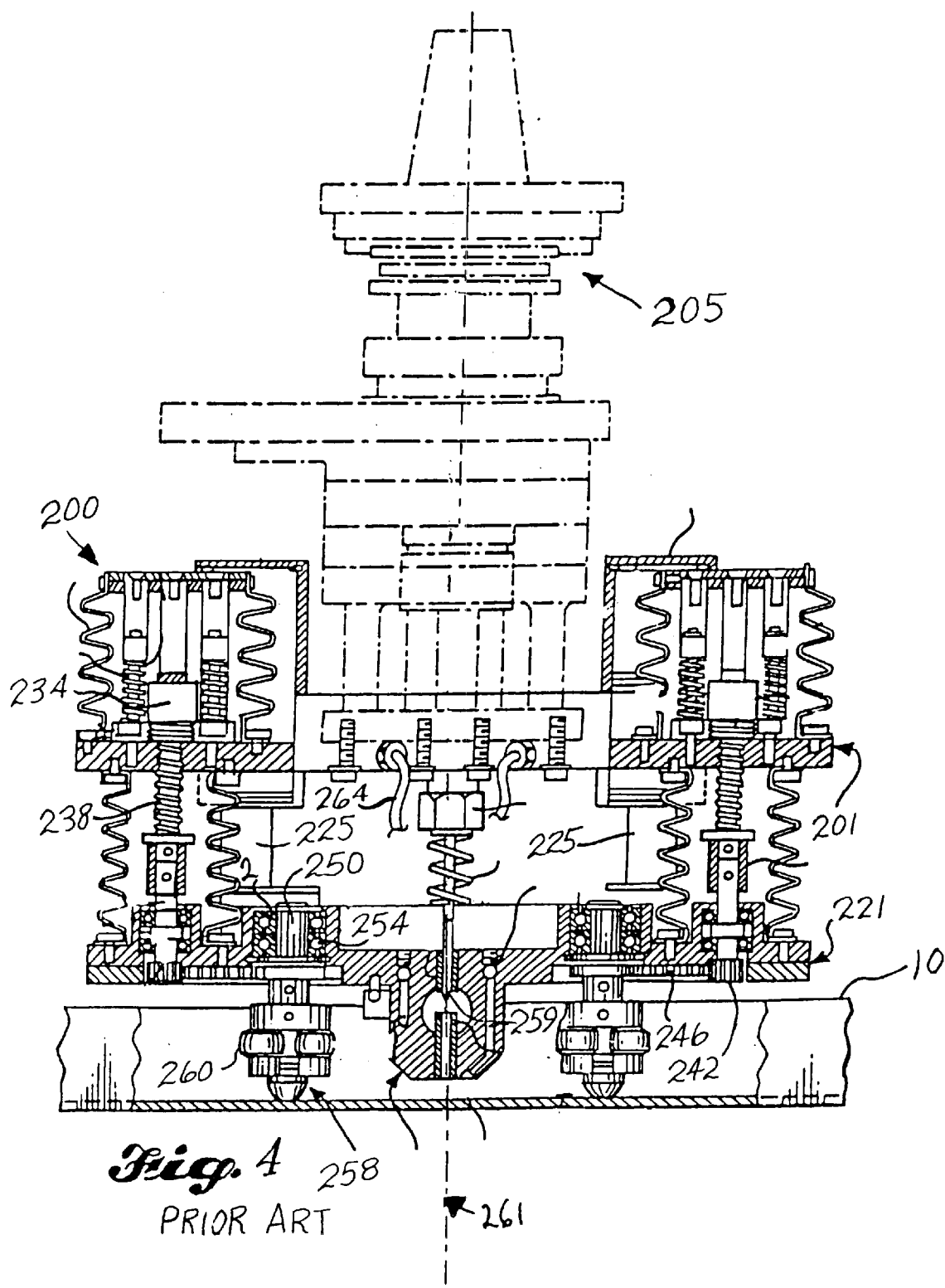
FIG. 4 is sectional elevation of a prior art end effector.

Referring now to the drawings, wherein like reference characters designate identical or corresponding parts, and more particularly to FIG. 1 showing a plurality of stringers 10 attached to a fuselage 12 of an aircraft by a plurality of fasteners 14. The stringers 10 are channel-shaped workpieces or U-shaped members, such as hat section stringers, having opposite walls 16 and 18 and a bottom 20. The opposite walls 16 and 18 along with the bottom 20 define a channel 22. FIG. 2 shows a tail section 25 of an aircraft. At the tail section 25, as well as other areas of the aircraft, the fuselage 12 narrows or otherwise makes a transition from a substantially cylindrical shape. When the shape of the fuselage 12 changes, the stringers 10 must be bent or curved to effect the change in shape. In some instances the curvature will occur along more than one axis and a compound contour will be formed, as shown in FIG. 3.

A prior art end effector 200 is shown in FIG. 4. A top plate 201 is attached to a speeder unit 205. A base plate 221 is connected to the top plate 201 by guide rods 225. A pair of nuts 234 mounted on the top plate 201 is threadedly engaged with a pair of lead screws 238 connected to the base plate 221 so that vertical movement of the base plate 221 will push the lead screws 238 through the nuts 234 and rotate the lead screws 238. A pinion 242 is coupled to each of the lead screws 238 and engaged with a sector gear 246 mounted on a pair of paddle shafts 250 supported in bearings 254 and 255 in the base plate 221. A cam roller assembly 258 is connected to the lower end of each paddle shaft 250 and is rotated by the pinion 242 and sector gears 246 when the robot presses the end effector 200 into the bottom 20 of the stringer 10 so the top plate 201 moves downward toward the base plate 221, causing the lead screws 238 to move vertically in and rotate in the nuts 234. The rotating cam roller assemblies 258 engage the walls 16 and 18 of the stringer 10 and move the stringer 10 to the desired position centered under the axis of the end effector 200, whereupon the drill 259 drills the hole at the precisely predetermined position.

The prior art end effector 200 is not able to properly position a stringer that is not straight and flat. The prior art end effector must make contact with the bottom of the stringer at two points, one point for each of the cam roller assemblies 258. Each cam roller assembly 258 has a pair of cam rollers 260 that are rotated to contact opposite walls 16 and 18 of the stringer 10. The centerline 261 of the drill 259 is positioned in the channel 22 of the stringer 10 at a point corresponding to the center of the cam assemblies 258 and the center of the cam rollers 260. The four points of contact between the cam rollers 260 and the walls of the stringer 10 define the centerpoint. However, if the stringer 10 is not straight and flat the centerpoint of the end effector will not correspond to the desired location on the stringer. The centerpoint point will be off either because the two cam assemblies are unable to contact the bottom of the stringer simultaneously, or because the four points of contact with the walls of the stringer do not properly define a centerpoint on the stringer.

The prior art end effector 200 has tubes 264 which provide cooling air and lubricant. These tubes may be exposed during manufacturing operations, which makes them vulnerable to damage and therefore less reliable.

Figure 5:
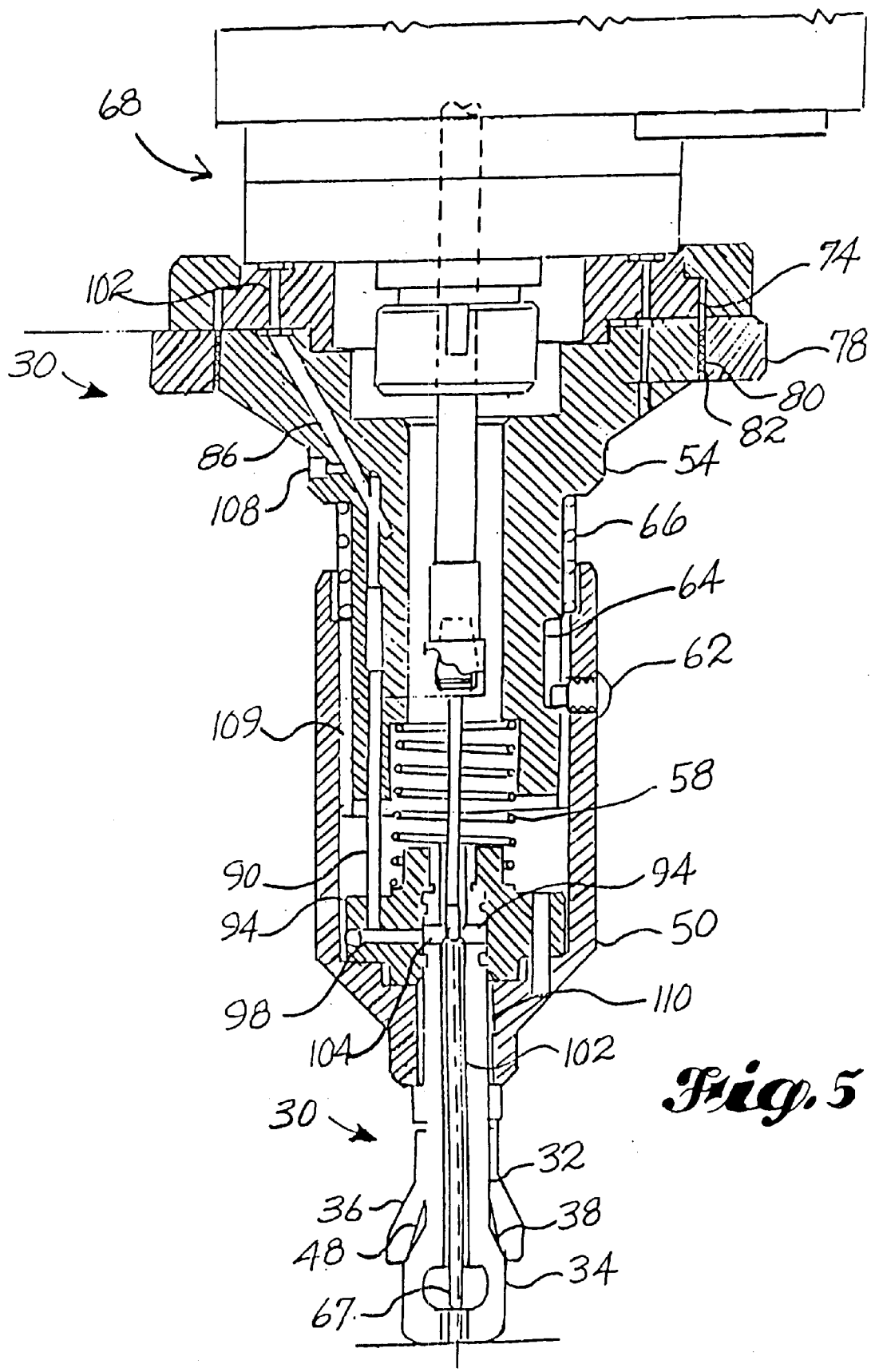
FIG. 5 is a sectional view of an end effector in accordance with this invention.

Referring now to FIG. 5, an end effector 30 made in accordance with this invention comprises an index shaft 32 with a wider portion 34, and a collet 36 slidably mounted about the index shaft 32. The wider portion 34 may be cylindrical, polygonal, or some other shape. In an embodiment of this invention the wider portion 34 of the index shaft 32 has a tapered portion 38. In another embodiment of this invention the tapered portion 38 is rounded. The collet 36 is radially expandable and adapted such that the collet 36 will expand as it is forced over the wider portion 34 of the index shaft 32.

Figures 6, 7:
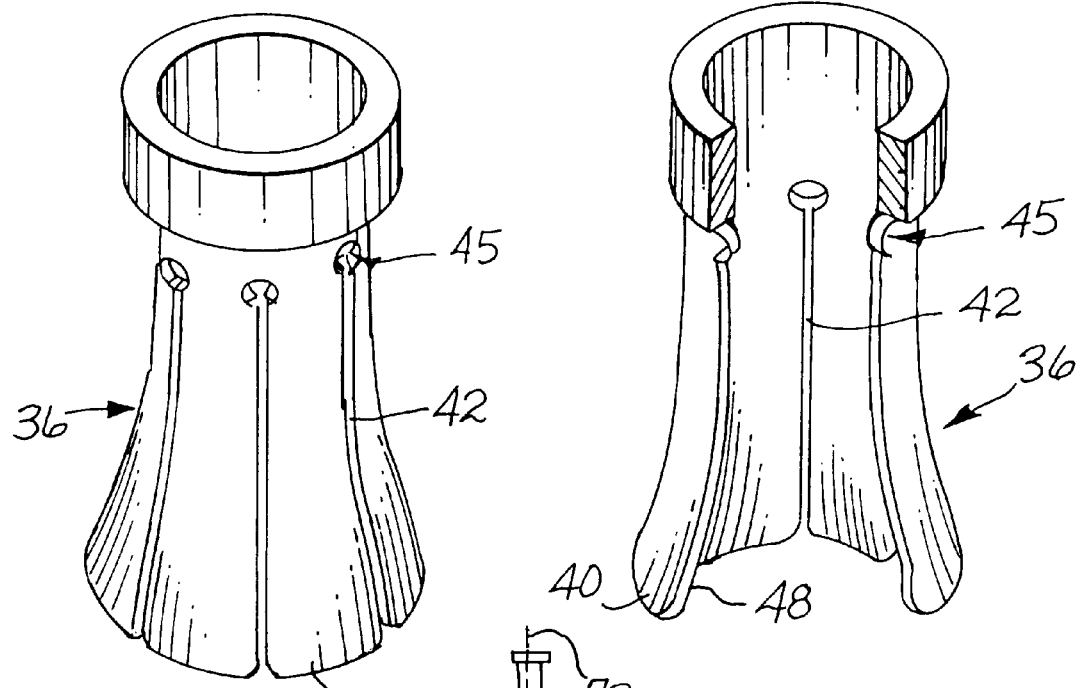
FIG. 6 is a perspective view of the collet.
FIG. 7 is a perspective cut away view of the collet.

Referring to FIGS. 6 and 7, in a preferred embodiment the collet 36 is comprised of equally divided segments 40 to provide uniform radial expansion. In this preferred embodiment, the equally divided segments 40 are forined by equally spaced slits 42. Stress relief holes 45 are provided to reduce stress at the top of the slits 42. In a further embodiment, the inner surface 48 of the collet 36 are tapered. The collet 36 will typically be made of a flexible resilient material. The collet could be made from a variety of materials or combination of materials such that the contacting points on the walls 16 and 18 of the stringer 10 can be maintained equidistant. The collet 36 could also have hinged sections to provide for radial expansion, in which case it may be necessary to add a spring about the collet to enable it to function in multiple orientations. The material of the collet maintains dimensional integrity around the centerline of the end effector 30. The material would typically be plastic, but wood, metal, graphite or fiberglass could be used, in addition to other materials which would be known by those skilled in the art.

Figure 8:
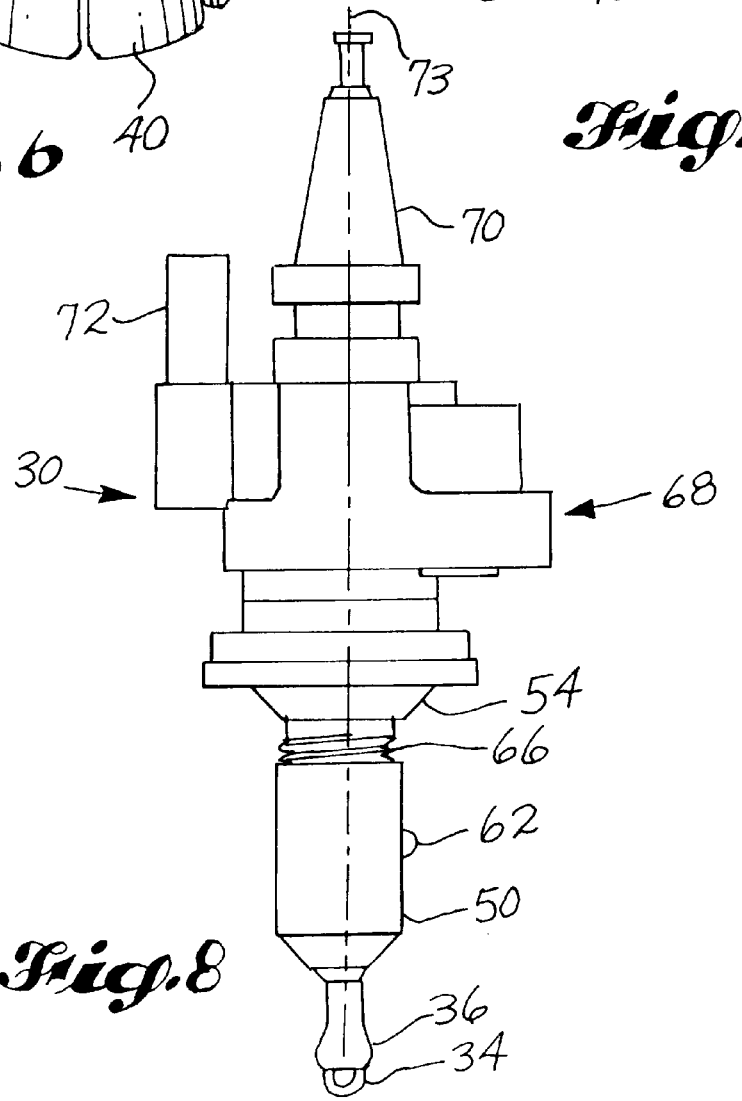
FIG. 8 is a view of the present end effector in assembled form.

Referring now to FIGS. 5 and 8, the description of the end effector 30 will be with respect to this orientation, and words such as "vertically," "under," "over," "upper," "lower", or other references to relative position will refer to this orientation of the end effector 30. However, this position reference is merely for convenience of description since the end effector can be used in any orientation, so those words should be understood to apply to the end effector in its upright position as shown.

In an embodiment of this invention, a housing assembly 50 is slidably mounted about the index shaft 32 and secured to the collet 36. It is not necessary to secure the collet 36 to the housing assembly 50. The collet 36 can slide freely along the index shaft 32 and just be abutted against the housing assembly 50. The collet 36 can have a spring rate sufficient to bias itself away from the bottom of the index shaft 32. A flange base 54 is mounted partially within the housing assembly 50 and an inner spring 58 is mounted within the housing assembly 50 interposed between the flange base 54 and the index shaft 32 to provide an axial bias. The inner spring 58 biases the index shaft 32 away from the flange base 54. As the index shaft 32 is forced against the bottom of the stringer, the inner spring 58 compresses which allows the housing assembly 50 to slide over the index shaft 32 forcing the collet 36 over the wider portion 34 of the index shaft 32. As the collet 36 slides over the wider portion 34 of the index shaft 32 it expands radially until it contacts one of the walls 16 and 18 of the stringer 10. Continued radial expansion of the collet 36 will move the stringer 10 toward the desired position. Once the desired position is reached, the collet 36 will have expanded until it contacts opposite walls 16 and 18 of the stringer and achieves a force balance. The housing assembly 50 will preferably be attached to the flange base 54 by a single lock screw 62 for easy removal of the housing assembly 50 during maintenance operations, although a plurality of lock screws could also be used. The lock screw 62 fits into a channel 64 in the flange base. Although reference is made to a stringer, the end effector of this invention can be used on any part having opposite walls which will allow a force balance to be achieved, such as any channel shaped workpiece.

In another embodiment of the end effector according to this invention, an outer spring 66 is mounted about the flange base 54 and interposed between the flange base 54 and the housing assembly 50. The outer spring 66 biases the housing assembly 50 away from the flange base 54 and the housing assembly 50 is slidably mounted over the flange base 54. As the end effector 30 moves downward against the stringer 10 the outer spring 66 compresses allowing the distance between the housing assembly 50 and the flange base 54 to shorten so a drill bit 67 can act on the stringer. In a preferred embodiment of this invention, the outer spring 66 is less compliant than the inner spring 58. When the end effector 30 is pushed against the bottom 20 of the stringer 10, the inner spring 58 compresses first forcing the collet 36 to slide over the wider portion 34 of the index shaft 32. After a force balance is achieved by the collet 36 contacting the opposite walls 16 and 18 of the stringer 10, the outer spring 66 compresses and a drill bit 67 slides through the index shaft 32 and drills a hole in the bottom 20 of the stringer 10.

The end effector 30 of the present invention, will typically be mounted on a speeder assembly 68 having a conical connector 70. A positioning pin 72 located on the speeder assembly 68 is provided to one side of the centerline 73 of the end effector 30 to provide reaction torque and to position the end effector on the proper orientation. The positioning pin 72 also supplies compressed air for cooling the speeder assembly and removing chips around the work area in the vicinity of the wider portion 34 of the end effector 30. The speeder assembly is a commercially available piece of equipment made by Mizoguchi Ironworks & Company, Ltd., in Nara, Japan. While the end effector 30 will typically be mounted on the speeder assembly 68 for drilling applications, the end effector may be used without the speeder assembly, or with a different speeder assembly, as one of ordinary skill will be able to determine based on the desired operation.

When the end effector 30 is connected to a speeder assembly 68, it is typically connected through an adaptor plate 74 secured to the speeder assembly 68. A lockdown collar 78 fits over the adaptor plate 74 and has threads 80 which engage threads 82 on the flange base 54. The use of the lockdown collar 78 allows the easy removal of the end effector 30 for maintenance and tool conversion.

To factory harden the end effector, internal manifolding may be provided to eliminate exterior tubing in the vicinity of the end effector. This factory hardening eliminates vulnerable tubing from the immnediate work area and makes the end effector more reliable in a factory environment. The internal manifolding comprises a first passage 86 provided in the flange base 54. This first passage 86 is adapted to receive cooling air. An air transfer tube 90 is mounted slidably within the first passage 86 and connects the first passage 86 to a manifold block 94. The manifold block 94 has a second passage 98 which connects to the index shaft 32. The index shaft 32 has a hole 102 running through its centerline to accommodate the drill bit 67. A third air passage 104 connects the hole 102 to the second air passage 98 allowing air to flow to the drill bit 67. According to this invention, air flows internally through the flange base 54, through the air transfer tube 90 into the manifold block 94 into the index shaft 32 and along the drill bit 67. In a preferred embodiment, a lubrication port 108 is connected to the passage 86 along the flange base 54, to allow a lubricant, such as BOELUBE®, to be introduced to lubricate the drill bit 67.

In addition, to further factory hardend the end effector, all slots are internal to the end effector 30 to prevent entry of foreign debris. The tolerances of the air transfer tube 90 and the lack of a seal between the air transfer tube 90 and the first passage 86 provide positive pressure within the end effector 30, to preclude entry of foreign matter. To protect the air transfer tube 90, a pin (not shown) is mounted in the housing assembly 50 and engages a slot (not shown) in the flange base 54. During assembly, the pin engages the slot prior to the air transfer tube 90 entering the first passage 86 and prevents damage to the tube during assembly and disassembly.

Another preferred embodiment of the end effector 30 of the present invention comprises many of the features of the other preferred embodiments. An end effector 30 for positioning a channel-shaped workpiece, such as a hat-section stringer 10, and drilling a hole at a predetermined position on the stinger 10 comprises a speeder assembly 74 with a conical connector 70 adapted to connect to a driven receptacle on a robot, such as the Jomach 16. The speeder assembly 68 has at least one outlet (not shown) to provide cooling air to the end effector. An adaptor plate 74 is secured to the speeder assembly 68 and has an opening through the center for a drill bit 67 to extend through. The adaptor plate 74 also has a hole 102 which aligns to the outlet to allow cooling air to pass through it. A flange base 54 is connected to the adaptor plate 74. The flange base 54 has an opening through which a drill bit 67 can extend as well as a first passage 86 which aligns to the hole 102 in the adaptor plate 74 to allow the passage of air from the speeder assembly 68. The flange base 54 has exterior threads 82 along an outer circumference of an upper portion. The flange base 54 also has a channel 64 running axially along an exterior surface. A lockdown collar 78 is secured concentrically about the flange base 54 and the adaptor plate 74. The lockdown collar 78 is fit securely over the adaptor plate 74 and has interior threads 80 that engage the exterior threads 82 of the flange base 54 to secure the flange base 54 to the adaptor plate 74 and allow for the removal of the end effector 30. A housing assembly 50 is slidably mounted concentrically around the flange base 54, through a linear bearing 109 , and has an opening through which the drill bit 67 can extend. A lock screw 62 secured to the housing assembly 50, and engaged in the channel 64 on the flange base 54, secures the housing assembly 50 to the flange base 54 while providing for easy removal of the housing assembly 50 for maintenance and replacement of the drill bit 67. An outer spring 66 is mounted concentrically around the flange base 54, interposed between the flange base 54 and the housing assembly 50, and biases the housing assembly 50 away from the flange base 54. An index shaft 32 is slidably mounted within the opening in the housing assembly 50. The slidable mounting is accomplished through a second linear bearing 110 . The index shaft has a wider portion 34 located at its lower end with reference to the FIGS. 5 and 8 .The wider portion 34 can be tapered or rounded as it transitions to the rest of the index shaft. An opening is provided through the center of the index shaft 32 to accommodate the drill bit 67. A passage 104 extends from the hole 102 radially through the index shaft 32. A manifold block 94 is secured concentrically around the index shaft 32 and within the housing assembly 50. The manifold block 94 has another passage 98 which aligns with the passage 104 in the index shaft 32. An air transfer tube 90 connects the passage 86 in the flange base 54 to the passage 98 in the manifold block 94. The combination of holes and passages allows air from the speeder assembly 68 to travel through the adaptor plate 74, through the flange base 54, through the air transfer tube 90, through the manifold block 94, through the index shaft 32 and along the drill bit 67 to provide cooling. A lubrication tap 108 is connected to the passage 86 in the flange base 54 to introduce a lubricant such as BOELUBE® into the air to lubricate the drill bit 67. An inner spring 58 is mounted concentrically within the housing assembly 50 and is interposed between the flange base 54 and the manifold block 94. The inner spring 58 biases the manifold block 94 and attached index shaft 32 axially away from the flange base 54. The inner spring 58 is more compliant than the outer spring 66. A collet 36 is mounted concentrically about the index shaft 32 such that when the index shaft 32 slides partially within the housing assembly 50 the collet 36 slides over the index shaft 32. The collet 36 is radially expandable.

Referring now to FIGS. 9, 10 and 11 depicting the end effector in operation, the end effector 30 is inserted into the channel 22 of the stringer 10. Once the index shaft 32 contacts the bottom 20 of the stringer 10, further Z-axis, pushing force, will cause the collet 36 to expand until it contacts at least one of the opposite walls 16 and 18. In FIG. 9, the collet 36 is shown contacting the wall 16 first, although either wall could be the initial wall contacted depending upon initial alignment. As the collet 36 is forced down further over the index shaft 32, the collet 36 continues to expand forcing the stringer 10 in the desired direction until both of the opposite walls 16 and 18 are contacted by the collet 36 producing a force balance. Referring to FIG. 10, the stringer 10 has been forced to the left by the expanded collet 36 and a force balance has been achieved. After the force balance has been achieved further applied Z-force will not change the position of the stringer 10. The Z-force that is still being applied forces the drill bit 67 to act upon the stringer 10 to drill a hole in the stringer. FIG. 11 depicts the drilling operation.

After completion of the drilling operation, the end effector 30 will be removed and the collet 36 will return to its original unexpanded position, and the drill bit 67 will return to its original retracted position. The return operation is accomplished by outer spring 66 and the inner spring 58 forcing the housing assembly 50 and the index shaft 32 back to their original positions. The collet can also have a spring rate of its own to return it to its original position. It is also possible to have the collet 36 attached to housing assembly 50 and return with the housing assembly.

Since the collet has spring rate characteristics, the collet's spring rate must be included to determine the proper balance between the collet, the inner spring and the outer spring to determine the order of expansion and drilling. The desired balance will be readily determined by a person of ordinary skill based on the desired application.

Although certain preferred embodiments of the present invention have been described, the spirit and scope of the invention is by no means restricted to what is described above. For example, the present invention is not restricted to use on stringers or even use on aircraft. Also, a person of ordinary skill in the art will know of additional ways in which to construct an expandable collet.

What is claimed is:

1. An end effector comprising:

a) an index shaft, said index shaft having a wider portion;

b) a collet slidably mounted about said index shaft, said collet being radially expandable;

c) a housing assembly slidably mounted about said index shaft;

d) a flange base mounted partially within said housing assembly;

e) an inner spring mounted within said housing assembly and interposed between said flange base and said index shaft, said inner spring biasing said index shaft away from said flange base; and f) an outer spring mounted about said flange base and interposed between said flange base and said housing assembly, said outer spring biasing said housing assembly away from said flange base and against said collet, and wherein said flange base is slidably mounted to said housing assembly.

2. An end effector as claimed in claim 1, wherein said outer spring is less compliant than said inner spring.

3. An end effector comprising:
   a) an index shaft, said index shaft having a wider portion;
   b) a collet slidably mounted about said index shaft, said collet being radially expandable;
   c) a housing assembly slidably mounted about said index shaft;
   d) a flange base mounted partially within said housing assembly;
   e) an inner spring mounted within said housing assembly and interposed between said flange base and said index shaft, said inner spring biasing said index shaft away from said flange base; and
   f) a speeder assembly connected to said flange base.

4. An end effector as claimed in claim 3, wherein said speeder assembly is connected to said flange base by an adaptor plate secured to said speeder assembly and said flange base is mounted to said adaptor plate by a lockdown collar.

5. An end effector comprising:
   a) an index shaft, said index shaft having a wider portion;
   b) a collet slidably mounted about said index shaft, said collet being radially expandable;
   c) a housing assembly slidably mounted about said index shaft;
   d) a flange base mounted partially within said housing assembly;
   e) an inner spring mounted within said housing assembly and interposed between said flange base and said index shaft, said inner spring biasing said index shaft away from said flange base; and
   f) internal manifolding to provide air.

6. An end effector as claimed in claim 5, wherein said internal manifolding comprises:
   a) a first passage formed in said flange base;
   b) an air transfer tube mounted slidably within said first passage in said flange base;
   c) a manifold block having a second passage connected to said air transfer tube; and
   d) said index shaft having a first hole running axially along a centerline and a third passage connecting said first hole to said second passage in said manifold block.

7. An end effector as claimed in claim 5, wherein at least one lubrication port is connected to said internal manifolding.

8. An end effector for positioning a channel-shaped workpiece and drilling a hole at a predetermined position in the workpiece comprising:
   a) a speeder assembly, said speeder assembly having a conical connector adapted to connect to a driven receptacle on a robot and at least one outlet for cooling air;
   b) an adaptor plate secured to said speeder assembly, said adaptor plate having at least one hole aligned to said outlet and an opening through which a drill can extend along a drill axis to drill a hole in a workpiece,
   c) a flange base connected to said adaptor plate, said flange base having an opening through which said drill can extend,
      i) said flange base having a first passage aligned to said hole in said adaptor plate,
      ii) said flange base having an upper exterior, said upper exterior having threads,
      iii) said flange base having a channel along an exterior surface;
   d) a lockdown collar secured concentrically about said flange base and said adaptor plate, said lockdown collar being adapted to secure over the adaptor plate and having interior threads engaged to the threads on the upper exterior of the flange base for securing the flange base to the adaptor plate;
   e) a housing assembly slidably mounted concentrically around said flange base, said housing assembly having an opening through which said drill can extend;
   f) a lock screw secured to said housing assembly and said channel on said flange base for securing the housing assembly to the flange base while providing easy removal for maintenance;
   g) an outer spring mounted concentrically around said flange base, said outer spring biasing said housing assembly axially away from said flange base;
   h) a manifold block secured concentrically within said housing assembly, said manifold block having a second passage,
   i) an index shaft mounted within the opening in said housing assembly and secured to said manifold block, said index shaft having a tapered portion which transitions into a wider portion and an opening through a centerline aligned with said drill, said index shaft having a third passage that extends radially from said opening and aligns with said second passage in said manifold block,
   j) an air transfer tube connecting said first passage in said flange base to said second passage in said manifold block for allowing said cooling air to travel from the speeder assembly to the drill;
   k) a lubrication tap connected to said first passage in said flange base for introducing lubricant into said cooling air to lubricate said drill;
   l) an inner spring mounted concentrically within said housing assembly and interposed between said flange base and said manifold block, said inner spring biasing said manifold block and attached index shaft axially away from said flange base, said inner spring being more compliant than said outer spring; and
   m) a collet slidably mounted concentrically about said index shaft, said alignment collet being radially expandable.

9. A method of positioning a channel-shaped workpiece at a predetermined location therein, comprising:
   a) inserting an index shaft mounted on an end of an end effector into a channel in said channel-shaped workpiece;
   b) exerting an axial force on said index shaft with said end effector by pressing said index shaft in an axial direction against said workpiece; and
   c) converting said axial force to radial force thereby engaging opposite sides of said channel with a collet mounted concentrically around said index shaft to move said work piece to a desired position.

10. A method as defined in claim 9, wherein said converting step comprises:
   a) forcing said alignment collet down over said index shaft, said alignment collet expanding radially until said collet contacts at least one point on said channel;

b) forcing said alignment collet further down over said index shaft, said alignment collet applying a radial force at said point on said channel whereby said channel-shaped workpiece is forced to move; and c) forcing said collet further down over said index shaft until said collet expands to contact at least one point on each side of said channel whereby said collet reaches a force balance.

11. A method as claimed in claim 10, further comprising drilling a hole in said channel-shaped workpiece.

* * * * *

UNITED STATES PATENT AND TRADEMARK OFFICE
CERTIFICATE OF CORRECTION

PATENT NO. : 6,012,877
DATED : January 11, 2000
INVENTOR(S) : P. McCowin, et. al.

It is certified that error appears in the above-identified patent and that said Letters Patent is hereby corrected as shown below:

```
Title page, item [57], Abstract, line 1, correct -- adap ttachment --
to read --  "adapted for attachment".
```

Signed and Sealed this

Twenty-fifth Day of July, 2000

Attest:

Q. TODD DICKINSON

*Attesting Officer*  *Director of Patents and Trademarks*